United States Patent Office.

ERNEST GREENFIELD, OF NEW YORK, N. Y.

Letters Patent No. 99,880, dated February 15, 1870.

IMPROVEMENT IN CRACKERS, OR MEAT BISCUITS.

The Schedule referred to in these Letters Patent and making part of the same.

Be it known that I, ERNEST GREENFIELD, of the city, county, and State of New York, have invented certain new and useful Improvements in the Composition of Meat Crackers; and I do hereby declare the following to be a full and exact description of the same.

My invention relates to a nutritious cracker for food, composed of various ingredients, and kept in a state of preservation from change or decomposition produced by atmospheric or other influences.

My invention consists of animal and vegetable matter, that is to say, meats of various kinds, cereals, vegetables, and chemical ingredients combined in various ways and quantities.

To enable others skilled in the art to understand and use my invention, I will now proceed to describe the manner in which the same is or may be carried into effect.

Take meats, flour, (or cereals ground and prepared,) water, and salt. Boil these constituent together until the mass is reduced to a pulp of the proper consistency, when the residuum of water is filtered away. Spices and flavors are then added in sufficient quantity, such, for example, as mustard, pepper, Worcestershire sauce, cloves, &c., after which phosphite of lime or soda is mixed with the composition in the proportion of one grain to each pound of the mass. All superfluous moisture is then expelled by hydraulic pressure, the mass being subjected, if deemed desirable, to a smoking process either before or after its passage through the hydraulic press. The desiccated mass may now be cut by hand or machine into crackers of any size, shape, or weight which may be deemed expedient.

What I claim as new in the above-described process, and desire to secure by Letters Patent, is—

The heretofore-detailed combination, for the purpose of providing an improved nutritive cracker for food, which shall remain, from the peculiarity of its composition, proof against the mutations and decomposition produced by atmospheric and other chemical agencies.

ERNEST GREENFIELD.

Witnesses:
    JNO. D. PATTEN,
    ALONZO HUGHES.